US006270566B1

(12) United States Patent
Rademachers et al.

(10) Patent No.: US 6,270,566 B1
(45) Date of Patent: Aug. 7, 2001

(54) PROCESS FOR COLOURING BUILDING MATERIALS

(75) Inventors: Jakob Rademachers; Günther Teichmann, both of Krefeld (DE)

(73) Assignee: Bayer AG, Leverkusen (DE)

( * ) Notice: Subject to any disclaimer, the term of this patent is extended or adjusted under 35 U.S.C. 154(b) by 0 days.

(21) Appl. No.: 08/469,806

(22) Filed: Jun. 6, 1995

Related U.S. Application Data

(63) Continuation of application No. 08/310,625, filed on Sep. 22, 1994, now abandoned, which is a continuation of application No. 07/816,468, filed on Jan. 3, 1992, now abandoned, which is a continuation of application No. 07/516,801, filed on Apr. 30, 1990, now abandoned.

(30) Foreign Application Priority Data

May 10, 1989 (DE) .................................. 39 15 182
Jun. 8, 1989 (DE) .................................. 39 18 694

(51) Int. Cl.$^7$ ........................... C04B 14/02; C04B 14/36; C09C 3/06
(52) U.S. Cl. ........................... 106/712; 106/600; 106/628; 106/635; 106/426; 106/428; 106/431; 106/434; 106/435; 106/438; 106/442; 106/444; 106/446; 106/454; 106/457
(58) Field of Search .................................. 106/600, 628, 106/635, 426, 428, 431, 434, 435, 438, 442, 444, 446, 454, 457, 212; 23/313 AS

(56) References Cited

U.S. PATENT DOCUMENTS

| | | | |
|---|---|---|---|
| 1,982,541 | 11/1934 | Scripture, Jr. | 106/606 |
| 2,221,175 | 11/1940 | Bechtold | 106/659 |
| 3,687,640 | 8/1972 | Sams et al. | 22/313 AS |
| 3,707,386 | 12/1972 | Kurz | 106/635 |
| 3,778,283 | 12/1973 | Freyhold | 106/635 |
| 3,850,655 | 11/1974 | Adams | 106/931 |
| 3,856,545 * | 12/1974 | Ferrigno | 106/462 |
| 3,871,894 | 3/1975 | Kubo et al. | 106/954 |
| 3,873,351 | 3/1975 | Ueda et al. | 264/82 |
| 3,895,995 | 7/1975 | Spencer et al. | 23/313 AS |
| 3,899,346 | 8/1975 | Ferrigno | 106/414 |
| 4,171,227 | 10/1979 | Derolf et al. | 106/692 |
| 4,178,341 | 12/1979 | Caswell | 23/313 AS |
| 4,204,876 | 5/1980 | Bowden | 106/645 |
| 4,221,607 | 9/1980 | Dickerson | 106/457 |
| 4,222,790 | 9/1980 | Dickerson | 106/426 |
| 4,299,635 | 11/1981 | Dickerson | 106/457 |
| 4,328,035 | 5/1982 | Ingles et al. | 106/624 |
| 4,622,073 | 11/1986 | Hashizume | 106/403 |
| 4,701,222 | 10/1987 | Kobayashi et al. | 106/457 |
| 4,816,074 | 3/1989 | Raythatha et al. | 106/632 |
| 4,946,505 | 8/1990 | Jungk | 106/712 |

FOREIGN PATENT DOCUMENTS 15 92 919 3/1972 (DE) .
36 19 363 12/1987 (DE) .

OTHER PUBLICATIONS

Ramachandran, V.S., Ed., p. 538, *Concrete Admixtures Handbook* (Noyes Pub. 1984).
*Perry's Chemical Engineer's Handbook*, 6th Ed., McGraw–Hill, N.Y. 1984, pp. 8–58, 60, 61, 63.
"Properties of Soluble Silicates", Weldes, et al., *Industrial and Engineering Chemistry*, V. 61, Apr. 69, pp. 34, 38, 40.

* cited by examiner

*Primary Examiner*—C. Melissa Koslow
(74) *Attorney, Agent, or Firm*—Connolly Bove Lodge & Hutz LLP

(57) ABSTRACT

A process is disclosed for coloring building materials with inorganic pigments in the form of microgranulates. The granulates comprise one or more pigments and one or more compounds selected from boron, aluminum, silicon, titanium, zinc and tin.

17 Claims, No Drawings

PROCESS FOR COLOURING BUILDING MATERIALS

This application is a continuation of application number 08/310,625, filed Sep. 22, 1994, now abandoned which is a continuation of application Ser. No. 07/816,468, filed Jan. 3, 1992, now abandoned, which is a continuation of application Ser. No. 07/516,801, filed Apr. 30, 1990, now abandoned.

This invention relates to a process for coloring building materials with inorganic pigments in the form of microgranulates.

If building materials bound with cement and lime, such as plaster, calcareous sandstone, cement fibreboards or concrete slabs and especially roof tiles and paving stones and slabs are required to be colored, color is generally imparted by means of inorganic pigments. It is customary in the building industry to use iron oxides or iron hydroxides as red, black, brown or yellow pigments, manganese oxides as blackish brown pigments, chromium oxides as green pigments and titanium dioxides as white pigments. Further, carbon blacks may be used as black pigments, nickel and chromium rutiles may be used as yellow pigments, spinels containing cobalt may be used as blue and green pigments, spinels containing copper may be used as black pigments and the mixed crystals of barium sulphate and barium manganate may be used as blue pigments.

For coloring concrete materials, the pigments are normally used in a pulverulent form. As milled pigments they have the advantage of being easily dispersible. Completely homogenous distribution of such pigment powders in concrete mixtures can be completed within a short time of up to a few minutes. The disadvantage of these fine powders, however, is that they do not pour well but frequently cake together and agglomerate as lumps when kept in storage. Accurate dosing of the powders is then difficult. Another disadvantage of some powders is that they tend to throw up dust.

It is known that these disadvantages can be avoided when pigmenting concrete parts by using aqueous pigment suspensions instead of dry pigment powders. The use of such pastes or slurries containing 30 to 70% by weight of pigment has, however, only slowly become established since the additional water content may considerably increase the cost of transport, depending on the distance between the site of manufacture and the building site. Moreover, the large quantity of water present in the paste or slurry cannot be absorbed in all concrete mixtures.

The building industry has therefore mainly kept to the use of dry pigment powder. Pigments in the form of microgranulates such as are used in the plastics and lacquer industry have not hitherto been used because it was believed that such granulates with diameters from 25 to 600 μm would be difficult to disperse in concrete mixtures. Pigment agglomerates which are difficult to disperse require much longer mixing times. In the short mixing times conventionally used in the building industry, specks, streaks and nests of color occur on the surface of the concrete due to imperfect distribution of the pigment. The full intensity of color of the pigment then cannot develop and larger quantities of pigment are therefore required for obtaining a given intensity of color in the concrete workpiece.

Pigment granulates consisting substantially of pigment and one or more binder(s) for promoting dispersion of the pigment in concrete are described in DE-C 36 19363 for coloring concrete ware. The following are the binders mentioned in the said document for facilitating dispersion in concrete: Alkyl benzene sulphonate, alkyl naphthalene sulphonate, lignin sulphonate, sulphated polyglycol ether, melamine formaldehyde condensates, naphthalene formaldehyde condensates, gluconic acid, salts of low molecular weight, partially esterified styrene/maleic acid anhydride copolymers and copolymers of vinyl acetate and crotonic acid. The proportion in the pigment should preferably be from 2 to 6% by weight.

The above-mentioned dispersing agents act as liquefiers in the concrete mixtures. They influence the ratio of water to cement and affect the consistency of the concrete.

In the inorganic pigment itself, the binders added are organic substances which constitute foreign bodies.

It is an object of the present invention to provide free-flowing, non-dusting inorganic pigment microgranulates which are free from the above-described disadvantages of the state of the art for coloring building materials.

This problem has been solved by a process for coloring building materials with inorganic pigments in the form of microgranulates consisting of one or more pigments and of compounds of boron, aluminum, silicon, titanium, zinc and/or tin. The microgranulate inorganic pigments according to this invention can be mixed with building materials such as plaster, calcerous sandstone, cement or concrete, or other settable materials prior to curing. A completely homogeneous distribution of the pigment results when the microgranulates are mixed with the building materials in standard mixing units. The pigment disperses within the building materials in a short time, comparable to or better than that for pigment powders and slurries. This process is the subject matter of the present invention.

It has surprisingly been shown that these pigment microgranulates containing purely inorganic additives are comparable in their properties of dispersion in concrete preparations to pigment granulates containing substances which act as liquefiers in concrete preparation although they contain no organic substances.

Pigment microgranulates or bead granulates are granulates which are obtainable from pigment suspensions by spray drying. They may be produced in the spray drier by means of slowly rotating centrifugal atomizers or by pressure nozzles (one-material nozzles) or two-material nozzles having a low air/liquid ratio.

Whereas two-material nozzles give rise to particles with diameters of up to 200 μm, the atomizer disc can be used for the production of larger particles with diameters of up to 300 μm. The coarsest individual particles, measuring up to 600 μm and having a relatively narrow grain size distribution, are obtained when pressure nozzles are used. Secondary agglomerates with diameters larger than those mentioned above may be obtained by using spray driers with an integrated fluidized bed.

The compounds added according to the invention are preferably in the form of oxides and/or hydroxides but may consist of borates, aluminates, silicates, titanates, zincates and/or stannates which are added to the pigments either in the form stated or as substances which give rise to these compounds. Thus, for example, compounds which decompose in the manufacturing process to form oxides may be used, such as titanic acid esters or silicic acid esters.

In one particular embodiment of the process according to the invention, the compounds added are silica sol or waterglass. These are substances which are in any case present as components of concrete.

The quantity of compound added according to the invention may amount to 0.05 to 5.0% by weight, preferably from 0.1 to 1% by weight, calculated as oxide and based on the quantity of pigment. Smaller quantities are ineffective while larger quantities may give rise to difficulties in dispersion. The compounds may be used in the form of their solutions, as colloids, or as suspensions during the whole process of manufacture of the granulates or they may have already been added at the stage of pigment formation as such.

It has been found that the granulates according to the invention should not exceed a particular particle size, which depends on the pigment used. This particle size depends mainly on the bulk weight of the granulate, which in turn is a measure of the porosity of the particles. The porosity is in turn dependent on the solids content of the pumpable starting suspension before it is dried. This solids content of the suspension may vary according to the particle size and particle form of the pigment. The compacted bulk density or compacted bulk weight defined in DIN 53 194 of August 1957 is used as a measure of the bulk density. The pigment granulates according to the invention are distinguished by the fact that they do not decompose when the compacted bulk density is determined. The granulates according to the invention preferably have a compacted bulk density of from 0.5 to 2.5 g/ml, most preferably from 0.8 to 1.5 g/ml.

The particle size should not be too low since the fine particles measuring about 50 $\mu$m or less, depending on the properties of the pigment, are responsible for producing the dust of a dry powder. Moreover, the free flowing property of a powder is impaired by the presence of such small particles.

The granulates claimed according to this invention have an average particle size of from 50 to 500 $\mu$m, preferably from 100 to 300 $\mu$m.

Pigment microgranulates composed of particles of this size form free-flowing powders which are stable to handling and form no dust and are eminently suitable for coloring building materials when combined with the additives according to the invention. In contrast to what has hitherto been thought (DE-C 36 19363), the shearing forces acting on the granulates in concrete mixtures are sufficient for complete dispersion of the pigment during a mixing cycle.

The inorganic pigments present in the granulates according to the invention are preferably oxides of iron, chromium or manganese and/or titanium oxides.

Particularly good results are obtained with iron oxide pigments.

The compacted bulk density of the granulates may vary according to the pigment, the type and quantity of additive and the water content of the suspension. If the compacted densities are low, the granulates obtained are unstable while high compacted densities result in poor dispersibility. The iron oxide black granulates according to the invention preferably have compacted bulk densities of from 0.8 to 1.0 g/ml and iron oxide red pigment granulates preferably have compacted bulk densities of 1.2 to 1.4 g/ml.

The granulates according to the invention normally contain about 1% by weight of water. The water content may be higher, depending on the fineness of the pigment particles and their form, without the free-flowing quality of the granulates being thereby deleteriously affected. Thus iron oxide red pigment granulates containing 0.15% by weight of $SiO_2$ in the form of sodium silicate may contain 6% by weight of water without suffering any disadvantages, but the water content should not exceed 10% by weight.

The process according to the invention will now be described in more detail with the aid of the following Examples which, however, should not be regarded as limiting the scope of the invention.

In the examples given, the pourability was determined by applying the measurement of the outflow time from a DIN-4 cup (DIN 53211 of April 1974) analogously to the granulates to be tested.

The dispersibility in concrete was tested by measuring the color intensity of prisms produced with white cement according to the following data: Ratio of cement to quartz sand 1:4, water:cement value 0.35, pigmentation level 1.2%, based on the cement; mixer used: Model 1551 of RK Toni Technik, Berlin, with 5 l mixing bowl, speed of rotation: 140 revs/min (mixture made up with 500 g of cement). Four sample mixtures (300 g) were removed after 30, 40, 50, 60, 70 and 80 seconds and used to produce sample bodies (5×10×2.5 cm) under a pressure of 32.5 N/mm². The sample bodies were hardened for 24 hours at 30° C. and 95% relative humidity followed by drying at 50° C. for 24 hours. Color data measurement using a Hunterlab apparatus: 3 measuring points on the upper side and on the under side, 24 measuring points per pigment mixture. The average values obtained are based on the sample which was mixed for 80 seconds (final color intensity=100%).

For further testing of the dispersibility, mixtures were prepared in a larger "Zyklos" mixer having a capacity of 80 kg. For this purpose, sand and cement were first mixed dry (30 seconds) and the pigment granulate was added only after the addition of water and further mixing (again 30 seconds). The results obtained, determined on concrete roof tiles, agree with the dispersibility obtained when a small laboratory mixer is used.

EXAMPLE 1

40 kg per hour of an aqueous suspension of iron oxide black obtained as intermediate product of the production of black iron oxide Bayferrox 330 (Trade Product of Bayer AG) were introduced into a spray drier. 1% by weight, based on the iron oxide, of sodium silicate solution containing 360 g/l of $SiO_2$ was added to the paste containing about 50% by weight of iron oxide in the form of finely divided magnetite.

This suspension reached the hollow cone nozzle (spray angle 30°, bore 1.1 mm) installed in the drier at a pressure of 4 bar. The combustion gases entered the spray drier from the natural gas surface burner at a temperature of 480° C. The discharge temperature of the gases was 140° C.

20 kg per hour of iron oxide black pigment in the form of a mechanically stable granulate having an average particle size of 200 $\mu$m and a residual moisture content of about 1% by weight were obtained. The compacted density of the granulates was 0.93 g/ml. The pourability measured as the outflow time from a 4 mm DIN cup was satisfactory, being 64 seconds. The test for dispersibility in concrete prisms by measuring the development of color intensity with increasing mixing time up to 80 seconds showed that over 85% of the color intensity was developed after only 30 seconds mixing time and the final color intensity was obtained after 40 seconds, showing no change from then up to the complete 80 seconds.

For comparison, conventional pigment powder (iron oxide black Bayferrox 330) was also tested in the same test series. The color intensity of the powder in this case reached its maximum after 60 seconds and underwent no further change during the remainder of the mixing period of 80 seconds. Only 80% of the final color intensity was obtained after a mixing time of 40 seconds.

EXAMPLE 2

The procedure was the same as in Example 1 but with alterations of the additive introduced into the iron oxide black suspension. Instead of sodium silicate, 1% by weight, based on the pigment, of silica sol containing 30% by weight of $SiO_2$ was added.

The stable granulates obtained were composed of particles measuring from 150 to 250 μm which had a residual moisture content of 1.5% by weight, a compacted bulk density of 0.92 g/ml and an outflow time from a DIN-4 cup of 65 seconds. The final intensity of color in concrete was obtained after a mixing time of 40 seconds.

EXAMPLE 3

Sodium aluminate containing 2% by weight of $Al_2O_3$, based on the iron oxide black pigment, was added to the iron oxide black suspension from Example 1. The procedure was otherwise the same as in Example 1.

The granulates obtained, which were stable when handled, had particle diameters in the region of 200 μm, a residual moisture content of 1.9%, a compacted bulk density of 0.90 g/ml and an outflow time of 70 seconds.

In the test for dispersibility, the final color intensity was obtained after a mixing time of 50 seconds.

EXAMPLE 4

1% by weight of silicic acid tetraethyl ester, based on the quantity of pigment, was added to the iron oxide black suspension. The procedure was otherwise the same as in Example 1. The solid granulates obtained in this case had a particle size of 200 μm, a moisture content of 1.5% by weight, a compacted bulk density of 0.94 g/ml and an outflow time from a DIN cup of 57 seconds. The final color intensity was obtained after mixing time of 50 seconds.

EXAMPLE 5

1% by weight of tetraethyl orthotitanate, based on the quantity of iron oxide, was added instead of the silicic acid ester used in Example 4.

The stable granulates had particle sizes in the region of 200 μm, a residual moisture content of 1.3% by weight and a compacted bulk density of 0.90 g/ml. The outflow time from the DIN cup was found to be 63 seconds and the final color intensity was obtained after a mixing time of 40 seconds.

EXAMPLE 6

The suspension to be dried consisted of 100 kg of iron oxide red Bayferrox 130 (Trade Product of Bayer AG) in 65 ml of water to which 0.5 kg of sodium silicate containing 360 g/l of $SiO_2$ had been added. The other process conditions were the same as in Example 1 except that the quantity of suspension introduced was 70 kg per hour.

The stable iron oxide red granulates obtained had an average particle size of 200 μm and a residual moisture content of 6% by weight. The compacted bulk density was 1.30 g/ml and the pourability was found to be excellent, amounting to 58 seconds when measured as the outflow time from a DIN cup. In the dispersibility test, the final color intensity in concrete prisms was obtained after a mixing time of 50 seconds.

COMPARISON EXAMPLE

4% by weight, based on the iron oxide black pigment, of ammonium lignin sulphonate were added instead of the sodium silicate used in Example 1. Stable granulates having particle sizes of from 150 to 250 μm were obtained. The residual moisture content was 1.5% by weight, the compacted bulk density was 0.97 g/ml and the outflow time from a DIN cup was 60 seconds. The final color intensity was obtained after a mixing time of 40 seconds.

No improvement in results was therefore obtained in this case when dispersing aids were added to the concrete mixtures.

What is claimed is:

1. A process for coloring inorganic building materials which comprises:
    (a) combining particulate inorganic building materials with microgranulates of pigments, said microgranulates
        (i) being substantially free of organic liquefiers;
        (ii) consisting essentially of one or more inorganic pigments selected from the group consisting of iron, chromium, manganese and titanium oxides, and from about 0.05 to about 1 percent (%) by weight, calculated as oxide and based on the quantity of pigment, of one or more boron, aluminum, silicon, titanium, zinc or tin compounds;
        (iii) having an average particle size between about 50 and 500 μm; and
        (iv) being sufficiently unstable to shearing forces such that they break down and disperse the pigment in the building materials substantially as if the pigment was not microgranulated; and
    (b) mixing the combination of building materials and microgranulates thereby subjecting the combination to shearing forces which break down the microgranulates and intimately disperse the pigment throughout the building materials to impart a final color intensity to the building materials.

2. The process as claimed in claim 1, wherein said compounds are present in the microgranulates in the form of oxides or hydroxides.

3. The process as claimed in claim 1, wherein said compounds are selected from one or more borates, aluminates, silicates, titanates, zincates or stannates.

4. The process as claimed in claim 1, wherein the compound contained in the granulates is sodium silicate in an amount of from about 0.05 to about 0.5 percent (%) by weight, based on the quantity of pigment.

5. The process as claimed in claim 4, wherein the sodium silicate is present in an amount of from about 0.05 to about 0.3 percent (%) by weight, based on the quantity of pigment.

6. The process as claimed in claim 1, wherein the compound contained in the microgranulates is silica sol in an amount of from about 0.05 to about 0.5 percent (%) by weight, based on the quantity of pigment.

7. The process as claimed in claim 1, wherein the silica sol is present in an amount of from about 0.05 to about 0.3 percent (%) by weight, based on the quantity of pigment.

8. The process as claimed in claim 1, wherein the compound contained in the microgranulates is present in an amount from about 0.1 to 1 percent (%) by weight, based on the quantity of pigment.

9. The process as claimed in claim 1, wherein the inorganic pigments are iron oxide pigments.

10. The process as claimed in claim 1, wherein the microgranulates have a water content of between about 0.1 to about 10 percent (%) by weight.

11. The process as claimed in claim 1, wherein the microgranulates have a compacted bulk density of between about 0.5 to about 2.5 g/ml.

12. The process as claimed in claim 1, wherein the microgranulates have an average particle size between about 100 to about 300 μm.

13. The process as claimed in claim 1, wherein the building material is a concrete mixture.

14. A dispersible microgranulate inorganic pigment composition for coloring inorganic particulate building materials, consisting essentially of:

(a) one or more inorganic pigments selected from the group consisting of iron, chromium, manganese and titanium oxides;

(b) from about 0.05 to about 1 percent (%) by weight, calculated as oxide and based on the quantity of pigment, of one or more boron, aluminum, silicon, titanium, zinc and tin compounds; and said microgranulates having an average particle size of between about 50 and about 500 $\mu$m, and being substantially free of organic liquefiers, and being sufficiently unstable to shearing forces such that when the microgranulates are combined with the inorganic building materials and mixed, the shearing forces of mixing break down the microgranulates and intimately disperse the pigment throughout the building materials to impart a final color intensity to the building materials, substantially as if the pigment was not microgranulated.

15. The dispersible microgranulate inorganic pigment composition for coloring inorganic particulate building materials of claim 14, wherein the average particle size of the microgranulates is between about 100 and about 300 $\mu$m.

16. The dispersible microgranulate inorganic pigment composition for coloring inorganic particulate building materials of claim 14, wherein the pigments are iron oxide pigments.

17. The dispersible microgranulate inorganic pigment composition for coloring inorganic particulate building materials of claim 14, wherein the compound is present in an amount between about 0.05 and about 0.5 percent (%) by weight.

* * * * *